United States Patent [19]

Duffield et al.

[11] Patent Number: 4,999,651
[45] Date of Patent: Mar. 12, 1991

[54] MULTI-COLOR RECORDER WITH PLURAL INK JETS AND RESERVOIRS CO-MOUNTED ON A RECIPROCATING CARRIAGE, EACH RESERVOIR CONTAINING A SUB-RESERVOIR IN COMMUNICATION WITH AN INK SUPPLY CONDUIT

[75] Inventors: Peter L. Duffield, Meredith; Arthur L. Cleary, Derry, both of N.H.

[73] Assignee: Vutek Inc., Meredith, N.H.

[21] Appl. No.: 467,657

[22] Filed: Jan. 19, 1990

Related U.S. Application Data

[63] Continuation-in-part of Ser. No. 343,917, Apr. 4, 1989, Pat. No. 4,914,522.

[51] Int. Cl.⁵ .................... G01D 15/16; B41J 2/045; B41J 2/11; B41J 2/175; B41J 2/21
[52] U.S. Cl. ............................ 346/140 R; 400/126
[58] Field of Search .............. 346/140 R, 75; 400/126

[56] References Cited

U.S. PATENT DOCUMENTS 4,658,273  4/1987  Yuki ................... 346/140 R

*Primary Examiner*—Benjamin R. Fuller
*Assistant Examiner*—Scott A. Rogers
*Attorney, Agent, or Firm*—E. T. Barrett

[57] ABSTRACT

A system for reproducing color images by electronically scanning an original to control the paint-spraying of a larger duplicate image. Multiple ink spray heads scan the width of the recording medium while being controlled by width-modulation of constant air pressure supplied to the heads. Ink is contained in multiple reservoirs that are each connected to one of the spray heads by a conduit extending substantially perpendicular to the direction of travel of the spray heads. Each ink reservoir contains a sub-reservoir with a bottom surface above the level of the bottom surface of the primary reservoir. Sloping deflector plates cause ink to flow from the primary reservoir into the sub-reservoir during acceleration or deceleration of the reservoirs. The height of the ink in the reservoir is such that a meniscus of ink is maintained on the tip of the spray jet during periods when ink is not being sprayed. A fill cap in each reservoir extends into the interior of the reservoir to limit the height of the ink in the reservoir and avoid spillage. The fill cap area is preferably one inch or more in diameter to permit visual observation of the ink during filling.

11 Claims, 6 Drawing Sheets

MULTI-COLOR RECORDER WITH PLURAL INK JETS AND RESERVOIRS CO-MOUNTED ON A RECIPROCATING CARRIAGE, EACH RESERVOIR CONTAINING A SUB-RESERVOIR IN COMMUNICATION WITH AN INK SUPPLY CONDUIT

REFERENCE TO RELATED APPLICATION

This application is a continuation-in-part of copending application Ser. No. 07/343,917 filed Apr. 4, 1989, now U.S. Pat. No. 4,914,522, entitled REPRODUCTION AND ENLARGING IMAGING SYSTEM AND METHOD USING A PULSE-WIDTH MODULATED AIR STREAM.

BACKGROUND OF THE INVENTION

1. Field of the Invention:

This invention relates to systems for reproducing color images by scanning an original and using electrical signals from the scanner to control the paint-spraying of a larger duplicate image. More particularly the invention relates to an improvement in the construction of the spray head and in the method and construction of the ink supply.

2. Description of Related Art:

Systems have been in use for making enlarged prints, such as for billboards, in which an original image is scanned to produce control signals that operate the reproduction equipment. One such system is described in U.S. Pat. No. 1,709,926 in which the original and the recording medium are each carried by a rotating cylinder. A color duplicate of the original is produced by mechanically controlling three ink jets in accordance with signals produced by scanning the original while the ink jets are moved slowly across the width of the recording medium.

U.S Pat. No. 1,817,098 describes a facsimile system using a first drum for scanning and a second drum for recording. The initial signal is divided into color components from which electrical control signals are generated. The control signals cause electric potentials to be applied to a pair of deflection electrodes positioned on opposite sides of a stream of atomized ink particles so that the ink stream is deflected toward the recording medium when an electrical potential is applied to the electrodes. When no voltage is present on the electrodes, the ink spray is prevented from reaching the recording medium.

U.S. Patent No. 3,553,371 describes another dual-cylinder system in which multi-color images are reproduced by using one or more ink-jet heads operated in synchronism with the scanning signals. The pressure of the air is amplitude modulated in accordance with the scanner signals and the modulated air controls a mechanical valve that regulates the rate of ink flow The extent to which the ink valve is opened is a function of the air pressure. The same patent also describes spray heads in which the ink jet is controlled by a mechanical valve operated directly by the scanner signals without pressure modulation of the air stream.

Jets that include a mechanical ink valve operated by the recording signals are slow and suffer from problems associated with contamination, clogging and wear of the valve mechanism. Various attempts to amplitude modulate the air stream and avoid the problems associated with variable ink valves have not been commercially successful, in part because the character of the atomized ink is a function of the pressure of the air that produces the ink spray.

SUMMARY OF THE INVENTION

As used here and in the accompanying claims, the word "ink" is to be interpreted to mean ink, pigmented paint or other colored liquid capable of producing an image. The present system for preparing large images, such as are used for outdoor advertising, artistic representations and other purposes, has a number of important advantages by producing the image on a long sheet of medium, for example of paper or vinyl, while it is being transported from a supply-roll to a take-up roll. The width and length of the image can be varied readily without major modifications of the system; and the tedious task of securing the recording medium to a cylinder is avoided. Moreover, very long images can be produced readily whereas a cylinder to accommodate such length would be very large with all the attendant difficulties of mounting the recording medium and precisely controlling the speed of rotation of the cylinder.

A flow of air, supplied at a constant pressure, is turned on and off in accordance with the control signals and passed over an ink meniscus. In other words, when the air pressure is turned on to cause ink to be sprayed on the medium, it is always at the same pressure. To achieve the desired imaging, the air is pulse-width modulated. The dot size on the image remains constant and the time the air is allowed to remain on within each pixel is varied to produce the desired density of color.

A nozzle is supplied with ink that forms a small meniscus on the tip of the nozzle. The pulse-modulated air flowing across the meniscus causes the ink to be sprayed onto the recording medium. It is important that the nozzle tip be formed of material that is wetted by the ink so that the meniscus formed on the end of the nozzle remains attached to the nozzle. The meniscus is thus maintained at all times at the tip of the nozzle, which is not true of systems in which the ink is forced by pressure from the nozzle or withdrawn into the nozzle at the end of each ink pulse. In systems in which the ink must be drawn through a supply conduit at the beginning of each pulse, for example because the meniscus is allowed to recede into the supply conduit at the end of each pulse, the response time is excessive. Such a system is also erratic because the response time for each pulse is a function of how far the meniscus has been allowed to recede into the supply conduit.

The maintenance of the meniscus at the tip of the nozzle limits the maximum diameter of the nozzle with a given ink. If the nozzle diameter is too small, the response time and rate of flow of the ink are adversely affected and clogging of the nozzle may become a problem. Moreover, because the force that can be resisted by the meniscus is an inverse function of its area, the use of a larger diameter nozzle reduces the amount of negative head that can be tolerated in the ink supply. It is preferred that the nozzle diameter be between 0.005 and 0.020 inches, with a preferred diameter of about 0.010 inches. The overall arrangement minimizes the problems of contaminated, clogged and worn valves and materially increases the speed and fidelity of the imaging process. For multicolor reproduction, a number of spray heads, usually four, are mounted on a carriage that reciprocates rapidly along a linear path across the width of the medium as the medium is moved slowly in incremental steps from a supply to a take-up roll.

In any arrangement, there is a finite period of time between the start of an air pulse and the initiation of the ink spray. This time interval must be constant and it must be short relative to the maximum pulse period. If pulses of ink are amplitude modulated as a function of the image being reproduced the response time interval will be variable as a function of the air pressure. In the present system the air pressure is constant resulting in a constant response time interval. The use of constant velocity air and an ink meniscus that remains at the end of the ink nozzle provides a minimum response time interval that is constant from pulse to pulse. In the system described here, the minimum pulse width to produce a flow of ink is about 100 microseconds.

One problem with ink spray systems of the general kind described here is gradual change in the printing characteristics during the printing process. For example when large billboards are printed, the printing is usually done in two or more strips which are subsequently mounted with abutting edges. Any change in color or intensity of the image is immediately apparent along the abutting edges of the two images. Difficulties of this nature can arise from a number of different sources. One common source is the buildup of ink on and around the jet spray nozzle. This buildup of drying ink causes a gradual change in the printing characteristics of the head and makes frequent and thorough cleaning an imperative. In systems of the kind described here in which the ink flow is in the form of a succession of distinct pixels, each generated with the same ink flow and of varying time duration to reproduce the desired image, any build-up of ink on the spray head or anything that causes a change in the rate of ink flow during a pixel will cause a deterioration of the reproduced image.

Another source of trouble is caused by transverse forces produced within the ink supply conduits to the spray heads. Four separate spray heads are mounted on a carriage for rapid reciprocating transverse movement across the width of the medium on which the image is to be reproduced. It is important that the individual heads be placed reasonably close together in order to simplify the control system and provide for maximum printing width. Any substantial lateral distance between the print heads causes an unacceptable increase in printing time. It is desirable to provide in the ink supply reservoirs, which are mounted on the same carriage with the spray heads, each connected by a supply conduit to one of the heads, as much ink capacity as possible to permit longer periods of uninterrupted machine operation. If a conduit connecting a reservoir to a spray head extends in a direction other than perpendicular to the direction of carriage movement, forces are induced on the ink in the conduits, by the acceleration and deceleration of the carriage, that either accelerates or retards the flow of ink to the spray head. For example, when the carriage decelerates rapidly near the end of one scan, the forces produced in an ink-supply conduit may cause an increase in the size of a meniscus that is formed on the ink jet in the spray head so that when the next pixel is printed, a blob of ink is sprayed onto the medium distorting the image. If the carriage decelerates while traveling in the opposite direction, the ink meniscus may be drawn back into the supply capillary causing a momentary delay in ink ejection when printing is resumed.

To provide maximum ink capacity in the supply reservoirs, the reservoirs may be elongated along the path of the carriage, but overly long ink reservoirs will limit the maximum printing width of the equipment. The variation in the depth of the ink in the supply reservoir during the printing operation must be limited in order to maintain a meniscus at the spray head with constant characteristics. If the level of ink were allowed to rise above the jet spray nozzle, the ink would flow out of the jet. If the level of the ink in the supply reservoir is allowed to drop too far below the level of the ink spray nozzle, the meniscus will be drawn back into the supply capillary and ink flow will be diminished. It has been found that it is practical to allow the ink to drop to a level not much more than one inch below the ink jet nozzle. A larger ink capacity, however, is provided by utilizing a two part ink reservoir in which ink from a part of the reservoir having a depth substantially greater than one inch is transferred, during the printing process, into a smaller supply cavity in which the variations in the ink supply are limited to those tolerable in the system. The forces for transferring ink into the smaller cavity are provided by the acceleration and deceleration of the carriage.

It is important that the ink reservoir be arranged so that it cannot be readily over-filled to a level above the level of the jet spray nozzle. This can be done, of course, by arranging the top of the reservoir to be level with the tip of ink spray nozzle. However, it is usually difficult to determine the level of ink in the reservoir when it is being filled and if maximum utility of the reservoir is to be obtained, spillage is likely. In the present arrangement, a fill tube of large diameter extends through the upper surface of the reservoir down to a level approximately equal to the level of the jet spray nozzle. When the ink reservoir is being filled, the ink will rise in the filling tube before it reaches the critical level in the reservoir and is easily observed. The amount of ink in the filler tube above the level in the ink reservoir represents only a relatively small vertical height when spread over the area of the ink reservoir and is sucked into the tank on the first scan of the carriage.

DESCRIPTION OF THE PREFERRED EMBODIMENTS

In the various illustrations, which are not to scale, similar elements are referred to by the same numbers followed by an identifying suffix. The illustrations are not meant to represent actual construction but are intended to assist in explaining the invention so that it can be readily applied by one skilled in the art.

Figure 1:
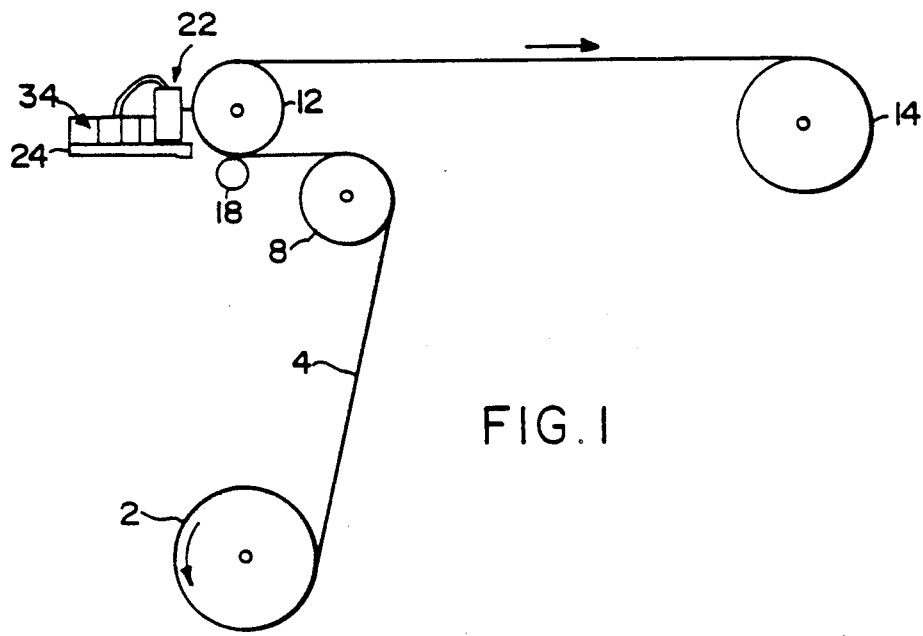
FIG. 1 is a partial diagrammatic cross-section of an image duplicating machine embodying the invention.
Figure 3:
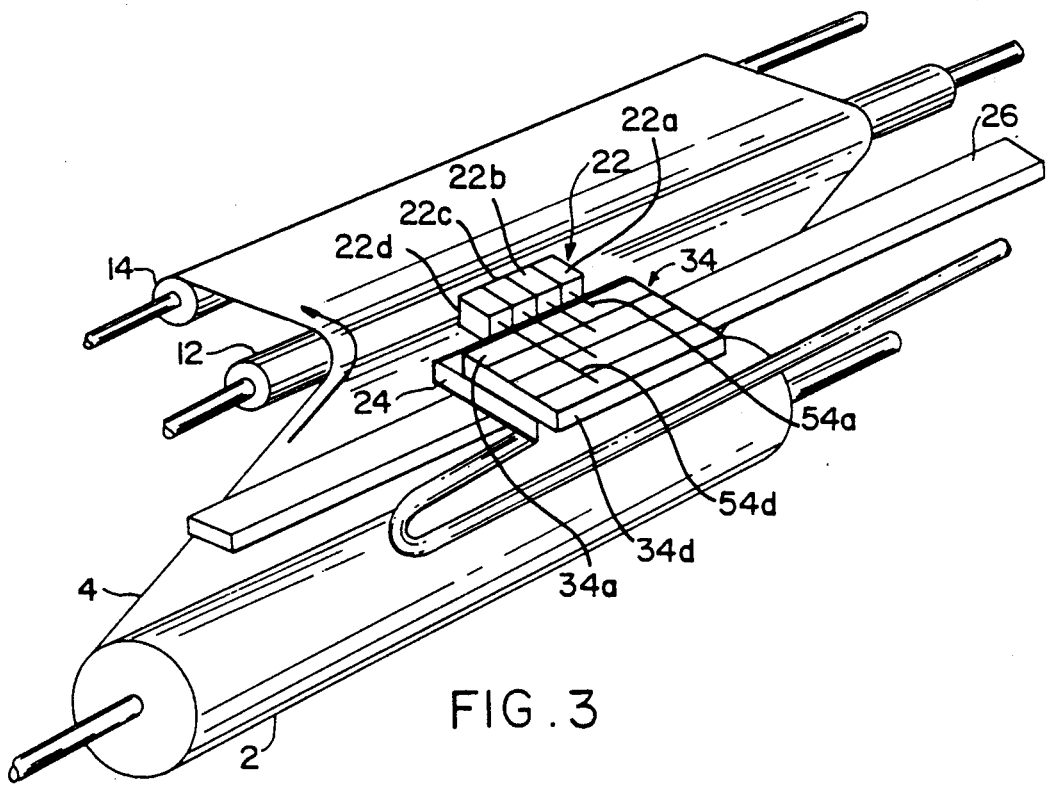
FIG. 3 is a diagrammatic perspective showing the positions of ink supply reservoirs.
Figure 2:
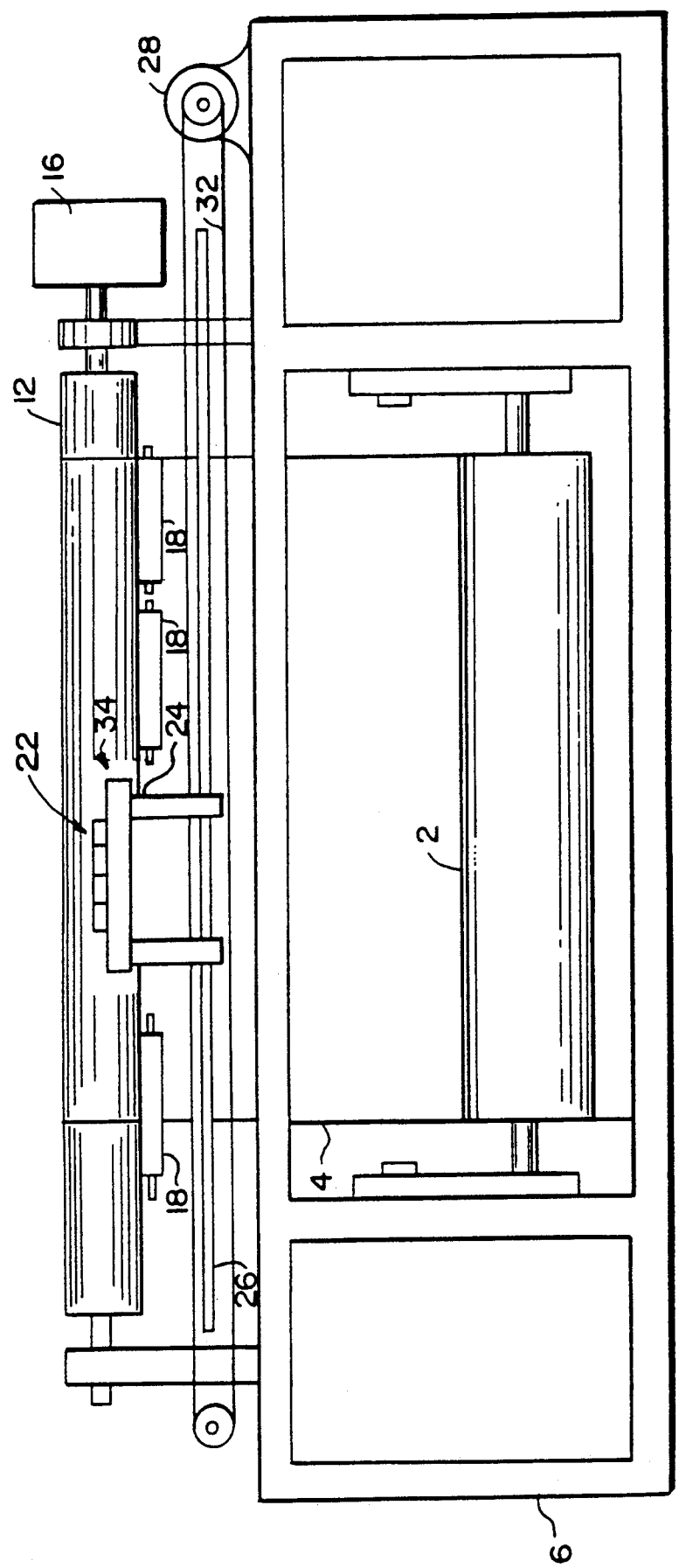
FIG. 2 is a diagrammatic view of the machine.

As shown in FIGS. 1–3, a roll 2 of imaging medium 4, which may be paper, vinyl or other sheet material is supported by a frame 6 of the image reproducing system. The medium passes over an idler roller 8 (shown only in FIG. 1), around a drive roller 12 and onto a take-up roller 14.

The drive roller 12 is driven by a stepper motor (FIG. 2). A series of rubber rollers 18 press against the outside of the medium 4 to prevent slippage between the medium and the outer surface of the drive roller 12. The motor 16 is coupled also, by a chain or other suitable drive means (not shown), to the take-up roller 14 through a slip clutch (not shown) that applies sufficient torque to maintain the medium 4 under tension.

Four ink spray heads, generally indicated at 22 (FIGS. 2 and 3) are positioned adjacent the surface of the medium 4 and are supported by a carriage 24. The carriage 24 is slidably mounted on a rail 26 and is driven back and forth across the medium by means of a motor drive 28 (FIG. 2) and a reversing drive cable 32. Ink for the four spray heads 22 is provided from a compartmented ink reservoir, generally indicated at 34 (34a, 34b, 34c, and 34d), carrying four different colors of ink, typically cyan, magenta, yellow and black.

Figure 4:
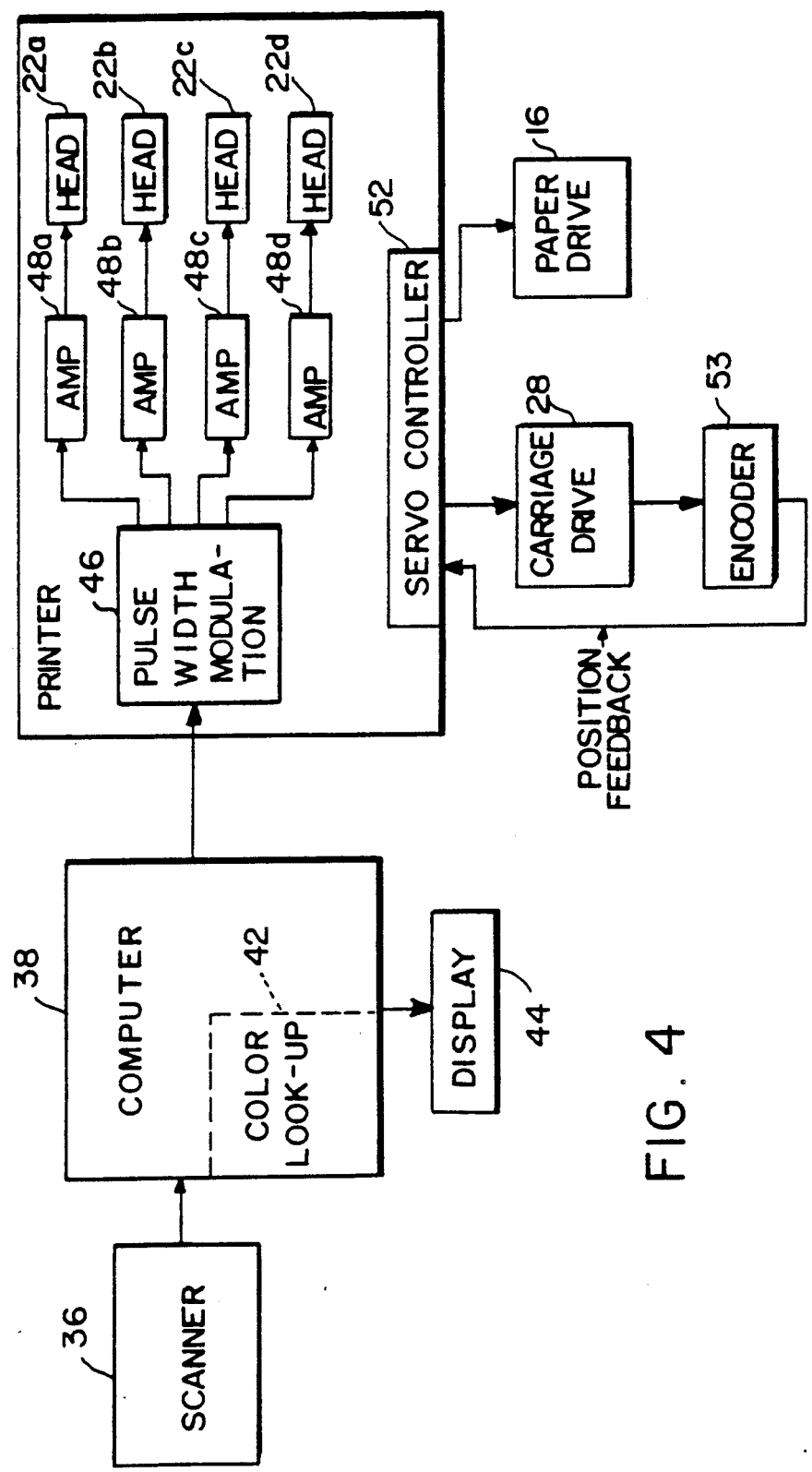
FIG. 4 is a block diagram illustrating the sequence of operations image reproduction process.

In operation, the image to be reproduced is placed on a conventional commercial scanner 36 (FIG. 4) and the image is scanned in conventional manner. The signals from the scanner are modified by a computer 38 to achieve the desired color effects with the particular inks being used. These signals control the flow of ink by the four spray heads 22a, 22b, 22c and 22d.

In this example, the image is divided into square pixels, each about 1/12 inch on each side. Each composite signal from the scanner 36 corresponds to one pixel from the image. The pixel signal from the image is divided by the computer 38 into appropriate signals representing the color components using conventional techniques. These signals then control the pulse widths of the air flows and thereby the duration of the spray of ink from each of the heads 22a, 22b, 22c and 22d. Each of four compartments of an ink reservoir 34 (FIG. 3), each associated with one of the heads 22, carries a different color ink. The rate of ink flow is not changed as a function of the color component, only the time during each pixel that the ink is allowed to spray onto the medium 4.

At the beginning of each pixel, a signal from the original image is transmitted to the appropriate spray head which is turned on for a length of time required to give the desired color perception. For example, at the beginning of a pixel, the control signals might indicate that the cyan head 22a is to be turned on for period of 600 microseconds, the yellow head 22c is to be turned on for a period of 1200 microseconds, the magenta head 22b is to be turned on for a period of 300 microseconds and the head 22d carrying the black ink is not turned on during this particular pixel.

At the end of each pixel, each of the spray heads is turned off for a period of about 100 microseconds to bring the system into stable equilibrium before the next pixel begins.

Obviously, one or more spray heads may not be used for a considerable period of time as a function of the colors being reproduced. To prevent the drying of the ink on the components of the spray heads 22 during such a period, the control circuits cause the spray heads 22 periodically to pass beyond the edge of the medium 4 Each spray head is then automatically discharged into a purge station for a short period to supply fresh ink to the spray head. The drive roller 12 is driven incrementally by the motor 16 to advance the recording medium by one line at the end of each scan of the spray heads 22.

The scanner 36 (FIG. 4) inspects the image to be reproduced laterally pixel-by-pixel and vertically line-by-line. For each pixel, a composite signal is generated carrying the color information. These signals are fed into a color look-up table 42 that forms part of the computer 38 by which the scanner signals are converted into data that controls the intensity of each of the four output colors. The scanned image is displayed on a computer display 44 so that the operator may make any desired adjustments in color balance. The signals from the computer are fed into a pulse width modulator 46. For each pixel of the scanned image, four signals are generated having a width that is a function of the intensity of that particular color for that particular pixel. The wider the pulse, the longer the corresponding spray will stay on and the more intense the color. The signals from the pulse-width modulator 46 are amplified by four amplifiers 48a, 48b, 48c, and 48d. The signals from each of the amplifiers is fed into a corresponding control mechanism, to be described, for the spray heads 22a, 22b, 22c and 22d, where a pulse of air is produced whose duration is a function of the width of the pulse from the corresponding amplifier 48.

A servo controller 52 provides signals that control the drive motor 28 to move the carriage 24 and the spray heads 22 on the rail 26. An encoder 53 feeds back to the servo controller 52 a signal representing the actual position of the carriage 24 on the rail 26 to maintain precise control of the printing action. The servo controller also provides the signals that operate the paper drive 16 to move the recording medium one line a the end of each sweep of the carriage.

Figure 5:
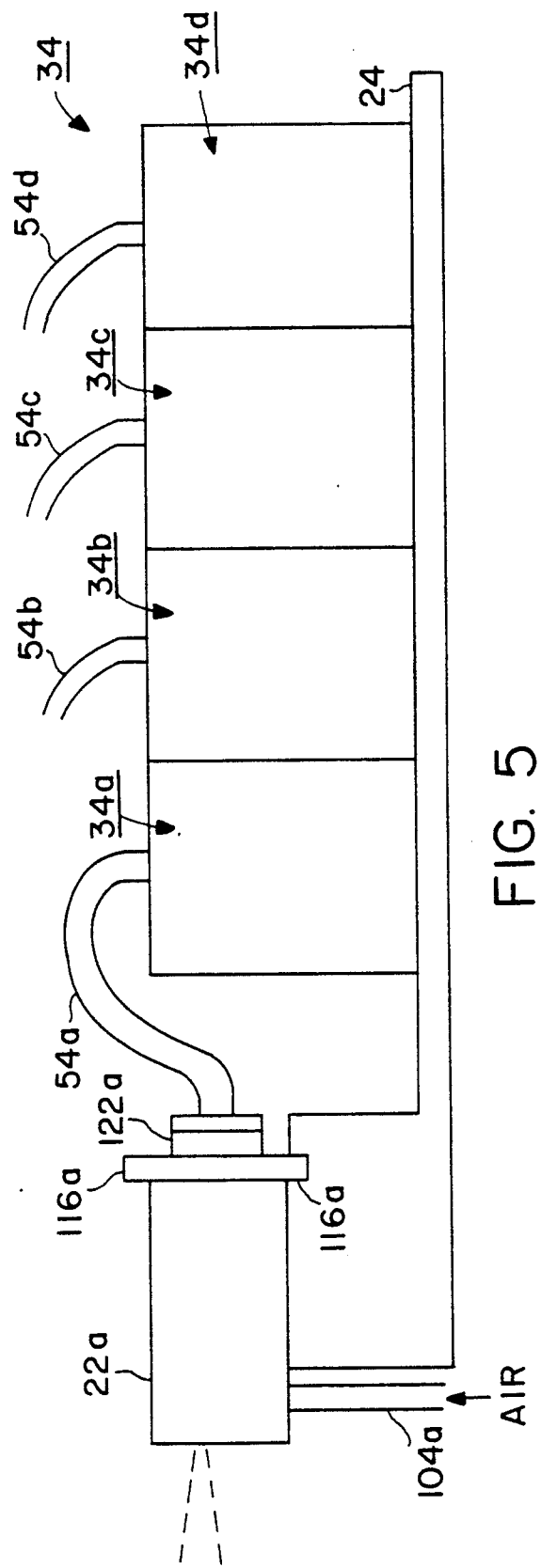
FIG. 5 is an end view showing the relationship of the ink supply reservoirs and the spray heads.
Figure 6:
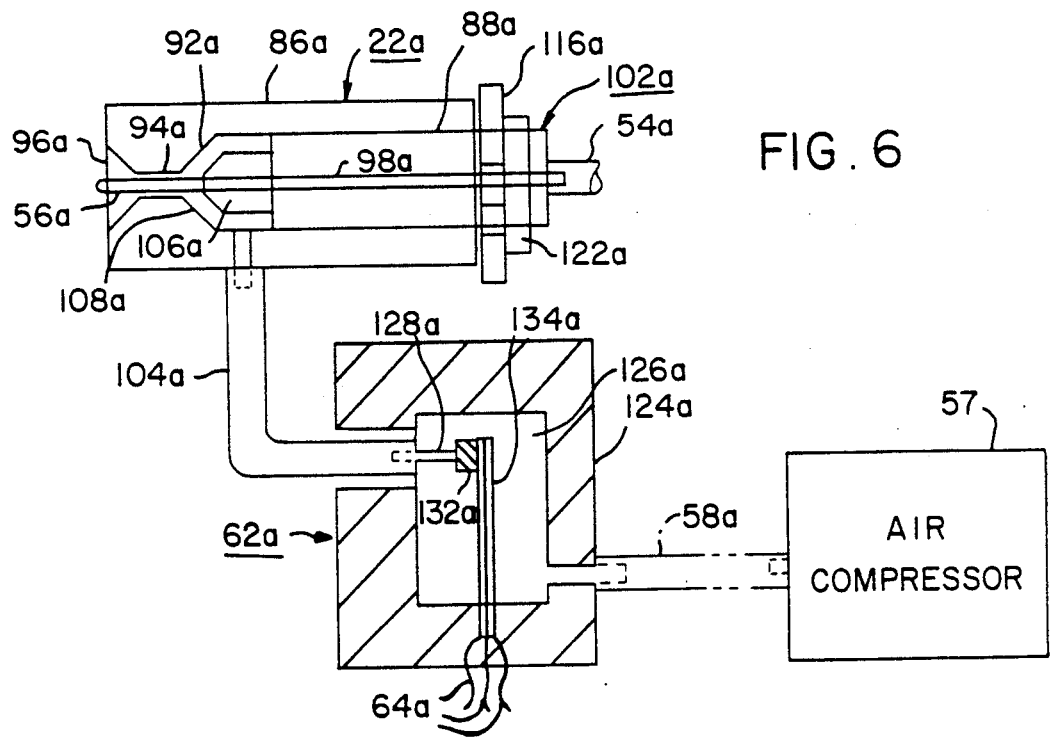
FIG. 6 is a cross-section of one of the spray heads with the associated ink and air supply elements.
Figure 7:
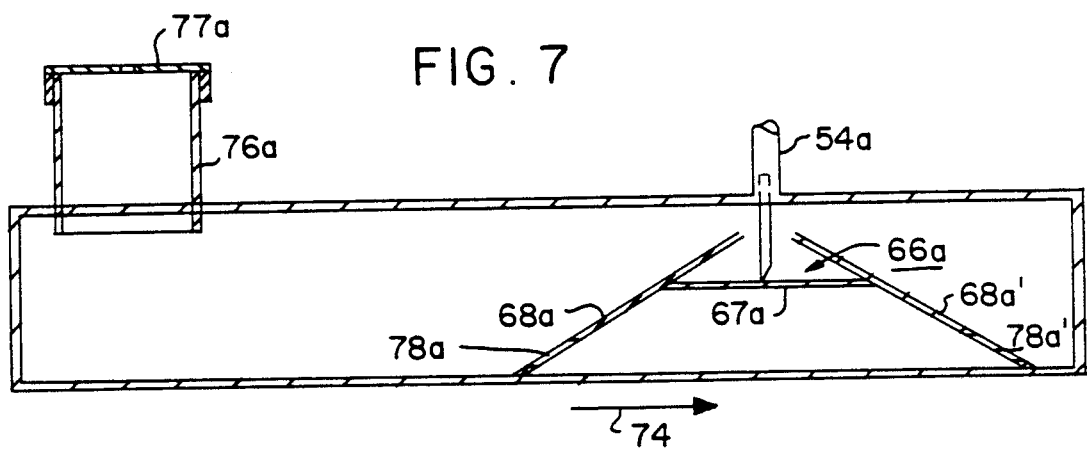
FIG. 7 is a longitudinal cross section of one of the ink supply reservoirs.

The operation of each of the ink spray assemblies is the same so only one unit is described. As shown in FIGS. 5 and 6, the ink reservoir 34a is connected by a flexible conduit 54a to the ink spray head 22a. The ink in the reservoir 34a travels through the conduit 54a to form a meniscus at the end of a spray nozzle 56 in the spray head 22a. A conventional source 57 of constant-pressure compressed air is applied at constant pressure through a conduit 58 to an air control valve, generally indicated at 62a. The valve 62a is opened and closed by the action of a piezo-electric actuator, to be described later. When voltage is applied to the valve through control leads 64a, the valve opens to permit the air to flow through the head 22a. When the voltage is removed the valve closes and no air flows into the spray head The maximum level of the ink in the reservoir 34a (FIG. 7) is positioned at approximately the same level as the tip of the nozzle 56a so that the level of the ink cannot rise above the level of the nozzle which would cause excessive ink flow. The ink is drawn from a sub-reservoir, generally indicated at 66a, within the reservoir 34a. The bottom 67a of the ink sub-reservoir 66a is not more than about one inch below the level of the nozzle 56a and is preferably about one-half inch below that level.

The bottom level of the reservoir 34a is appreciably lower than the bottom of the sub-reservoir 66a, for example, about one and one-half to two inches, to provide a significantly larger storage capacity. The sub-reservoir 66a is positioned in the interior of the reservoir 34a (see also FIG. 3 and 8) in such a position that its ink conduit 54 extends across the reservoir in a direction perpendicular to the direction of carriage travel. A pair of oppositely-disposed deflector plates 68a and 68a' extend upwardly at an angle of about 30 degrees from the bottom of the reservoir 34a to within a short distance from the top. An elevated plate extends between the inner surfaces of the deflector plates 68a and 68a' to form the bottom 67 of the sub-reservoir 66a. The side walls of the sub-reservoir 66a are formed by portions of the deflector plates and the side walls of the reservoir 34a.

In operation, when the reservoir is traveling in the direction of the arrow 74 (FIG. 7) and decelerates at the end of a scan the ink in the reservoir 34a flows upwardly over the surface of the deflector plate 68a and over the top into the sub-reservoir 66a. When traveling in the opposite direction, deceleration forces the ink upwardly on the deflection plate 68a' into the sub-reservoir 66a. The maximum ink depth in the sub-reservoir 66a preferably is about one-half inch A fill tube 76a extends through the upper surface of the reservoir 34a downwardly for a distance of about one-fourth inch and upwardly above the surface of the reservoir 34a about one and one-half inches. The fill tube preferably is about one to one and one-half inches in diameter so that any ink in the fill tube can be readily observed.

When the ink supply is replenished, ink is added until it is seen to be rising in the fill tube 76a at which time the ink level is about one-fourth inch below the upper surface of the reservoir 34a, as indicated by the broken line and approximately at the level of the open top of the sub-reservoir 66a A cap 77a, with a conventional vent opening, covers the fill tube 76a.

Openings 78a and 78a' permit ink to flow into the space between the deflector plates 68a and 68a' and between the end sections of the reservoir 34a.

Figure 8:
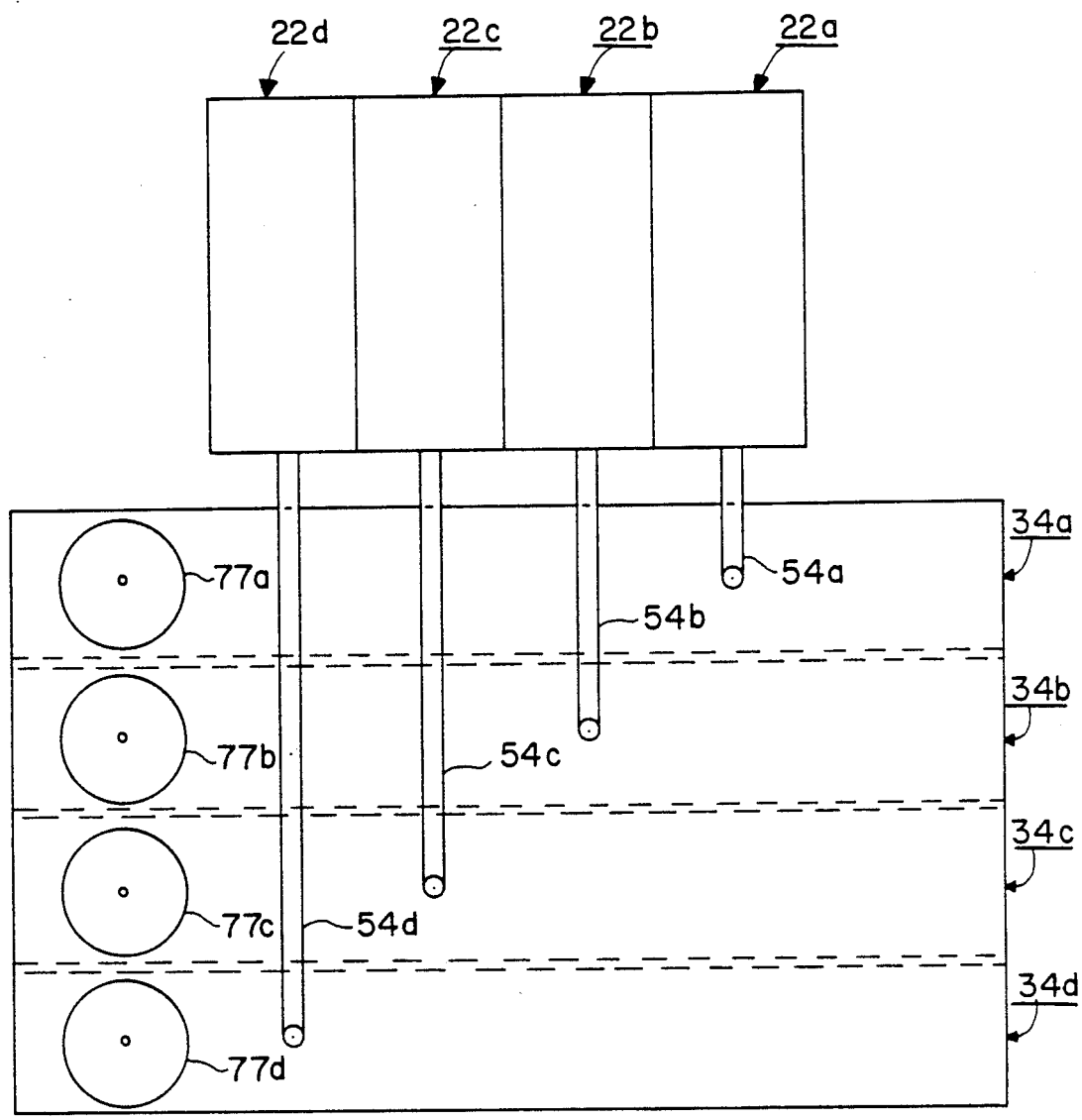
FIG. 8 is a top view of the four ink supply reservoirs showing the positions of the ink supply conduits relative to the respective spray heads.

Each of the conduits 54 carrying ink to the spray heads 22 preferably includes means forming a second and larger ink meniscus to assist in damping surges as described in the above-referenced co-pending application The ink reservoir 34 may be a single unit with the individual compartments 34a, 34b, 34c and 34d, or each of the compartments may represent a separate single-color ink reservoir. As noted above, it is important that the ink conduits 54a, 54b, 54c and 54d each extend perpendicular to the line of movement of the carriage 24. It is possible to deviate somewhat from this positioning without significant distortion of the color balance, however, no significant length of an ink conduit 54 should extend at an angle less than about 70 degrees from the line of travel of the carriage 24. Various configurations of the spray heads relative to the ink compartments are possible so long as the primary direction of ink travel is perpendicular to the direction of movement of the ink conduits. For example, as indicated diagrammatically in FIG. 1, the ink conduits may enter the upper surface of the spray heads 22, or, as indicated by FIGS. 3 and 8, the conduits may enter an adjacent face of the spray heads at the approximate level of the upper surface of the ink reservoirs, or, as indicated by FIG. 5 the ink conduits may go to a lower entry point below the top surface of the reservoirs, so long as the highest level of ink in the reservoirs is not above the level of the ink jet nozzle.

The spray head 22a (FIG. 6) includes a metal housing 86a with a longitudinal opening of round cross section through it. This opening has an enlarged portion 88a joined by a tapered section 92a to a smaller cylindrical section 94a. The outer end portion of the section 94a is flared to produce an air spray opening 96a at the end of the housing 86a.

Ink is delivered to the spray opening 96a through a longitudinal bore 98a in a spray control plug, generally indicated at 102a, connected by the conduit 54a to the sub-reservoir 66a.

The intermediate portion of the plug 102a is slidably positioned in the portion 88a of the bore 98a. A forward portion of the plug 102a is of reduced diameter, as indicated at 106a, followed by a tapered section 108a spaced from the tapered section 92a.

The ink jet nozzle 56a extends from and is connected to the bore 98a. Air to form the ink spray is provided by the constant-pressure compressor 57 and the air flow control valve 62a. The air passes through the conduit 104a into the space surrounding the reduced diameter portion 106a of the plug 102a. The air flows outwardly around the ink jet nozzle 56a.

The flow of air across the meniscus at the end of the nozzle 56a causes ink to be withdrawn from the nozzle, atomized and sprayed onto the medium 4 on which the image is to be reproduced.

The character of the ink spray depends upon the precise position of the tip of the jet nozzle 56a. To adjust the position, a nut 116a is in threaded engagement with the plug 102a and abuts the rear end of the housing 86a. The nut 116a is maintained in engagement with the surface of the housing 86a by a suitable slot supported by the carriage 24 and is secured in position by a locknut 122a.

The described arrangement minimizes deleterious ink build-up on the head. Ink may build up to some extent on the face of the housing 86a but causes little distortion if cleaned at reasonable intervals.

In the air valve 62a, a housing 124a forms a cavity 126a that is supplied with compressed air at constant pressure from the compressor 57 through the air conduit 58a. The air from the cavity 126a is delivered to the head 22a through the length of conduit 104a. The inner end of a short length of metal tubing 128a connected to conduit 104a opens into the cavity 126a, but can be sealed by a pad 132a that is actuated by a conventional piezo-electrically driven arm 134a. When voltage is applied to the arm through the leads 64a, the arm 134a flexes toward the right as viewed in FIG. 6 moving the pad 132a from the end of the tubing 128a allowing the air to be injected into the head 22a and draw ink from the ink jet nozzle 56a.

As described in the above-referenced co-pending application, a meniscus of ink is maintained at all times on the end of the nozzle 56 whenever the air is not flowing. This provides an instantaneous response to produce the atomized spray whenever the air is applied to the spray head 22.

I claim:

1. A multi-color image reproduction system comprising
   a source of control signals representing an image to be reproduced,
   a carriage,
   a plurality of spray heads supported by said carriage, each including a spray jet nozzle for spraying ink onto said medium,
   a plurality of ink reservoirs supported by said carriage and each carrying a different colored ink,
   drive means for reciprocating said carriage along a predetermined path, a plurality of ink supply conduits each extending from one of said reservoirs to one of said spray heads, each of said conduits extending for substantially its entire length in a direction perpendicular or nearly perpendicular to said path, a plurality of sub-reservoirs each positioned within one of said reservoirs and communicating with one of said conduits, the bottom of each of said sub-reservoirs being above the level of its associated reservoir, and ink transfer means for transferring ink from each of said reservoirs to one of said sub-reservoirs.

2. The combination as claimed in claim 1 wherein the bottom of each said sub-reservoir is between about one-half and one inch below the level of said spray jet nozzle.

3. The combination as claimed in claim 2 including ink transfer means for transferring ink from each of said reservoirs to its associated sub-reservoir.

4. The combination as claimed in claim 3 wherein said ink transfer means includes first and second oppositely-disposed sloping deflector plates positioned within said reservoir for transferring ink into said sub-reservoir when said carriage is accelerating or decelerating.

5. In an image reproduction system for producing an enlarged image on a reproducing medium, the combination comprising a carriage, a spray head supported by said carriage and having an ink jet nozzle for delivering ink to be sprayed onto said medium, drive means for reciprocating said carriage along a predetermined linear path, an ink reservoir supported by said carriage and including a sub-reservoir of lesser capacity within said reservoir, the bottom of said sub-reservoir being positioned at a level above the level of the bottom of said reservoir, an ink supply conduit connecting said sub-reservoir to said spray head, and means for transferring ink from said reservoir to said sub-reservoir.

6. The combination as claimed in claim 5 wherein the level of the bottom of said sub-reservoir is between about one-half and one inch below the level of said ink jet nozzle.

7. The combination as claimed in claim 5 wherein said ink transfer means includes a first sloping deflector plate positioned in said reservoir to transfer ink to said sub-reservoir under the acceleration or deceleration of said reservoir, said deflector plate forming an acute angle from the direction of movement of said carriage.

8. The combination as claimed in claim 7 wherein said ink transfer means includes a second and oppositely-disposed deflector plate forming an acute angle from the direction of movement of said carriage for transferring ink from said reservoir into said sub-reservoir.

9. The combination as claimed in claim 5 wherein said conduit extends for substantially all of its length in a direction at least about seventy degrees from the direction of said path.

10. The combination as claimed in claim 9 wherein said ink transfer means includes a sloping surface extending from near the bottom of said reservoir to an opening in said sub-reservoir whereby forces produced by changes in speed of the reservoir cause ink to flow along said sloping surface into said sub-reservoir.

11. The combination as claimed in claim 10 wherein the bottom of said sub-reservoir is between about one inch and one and one-half inch above the bottom of said reservoir.

* * * * *